US008539492B1

United States Patent
Beckford et al.

(10) Patent No.: US 8,539,492 B1
(45) Date of Patent: Sep. 17, 2013

(54) MANAGING DATA DEPENDENCIES AMONG MULTIPLE JOBS USING SEPARATE TABLES THAT STORE JOB RESULTS AND DEPENDENCY SATISFACTION

(75) Inventors: Jonah Beckford, Bothell, WA (US); Yohan Mammen, Renton, WA (US)

(73) Assignee: Amazon Technologies, Inc., Reno, NV (US)

( * ) Notice: Subject to any disclaimer, the term of this patent is extended or adjusted under 35 U.S.C. 154(b) by 677 days.

(21) Appl. No.: 12/729,855

(22) Filed: Mar. 23, 2010

(51) Int. Cl.
*G06F 9/46* (2006.01)
*G06F 17/00* (2006.01)
*G06Q 10/00* (2012.01)

(52) U.S. Cl.
USPC ........... 718/102; 718/101; 718/106; 718/100; 707/602; 707/999.008; 705/7.26

(58) Field of Classification Search
None
See application file for complete search history.

(56) References Cited

U.S. PATENT DOCUMENTS

| | | | | |
|---|---|---|---|---|
| 5,671,407 A | * | 9/1997 | Demers et al. | 707/999.008 |
| 7,058,615 B2 | * | 6/2006 | Yao | 706/12 |
| 7,174,551 B2 | * | 2/2007 | Bakow et al. | 718/100 |
| 8,108,864 B2 | * | 1/2012 | Alimi et al. | 718/102 |

* cited by examiner

Primary Examiner — Meng An
Assistant Examiner — Bing Zhao
(74) Attorney, Agent, or Firm — Thomas | Horstemeyer, LLP

(57) ABSTRACT

Disclosed are various embodiments for the management of dependencies on data. Multiple jobs are executed in one or more computing devices. It is determined that a first one of the jobs consumes data produced by a second one of the jobs, and a dependency is recorded. It is then determined whether the dependency is satisfied. When the dependency is determined to be unsatisfied, execution of the first one of the jobs is suspended. When the second one of the jobs produces the data, the dependency is updated as being satisfied. Execution of the first one of the jobs is resumed in response to the dependency being updated as being satisfied.

20 Claims, 3 Drawing Sheets

MANAGING DATA DEPENDENCIES AMONG MULTIPLE JOBS USING SEPARATE TABLES THAT STORE JOB RESULTS AND DEPENDENCY SATISFACTION

BACKGROUND

A data warehouse is a system for managing the data of an organization for purposes of reporting and analysis. The data warehouse may aggregate data from a diverse variety of operational systems and data stores across the organization. For example, a data warehouse for an online retailer may bring together data relating to customer purchases, data relating to network page views, data relating to a catalog of products, data relating to search queries, and many other types of data. The online retailer may execute a report using the data in the data warehouse to determine, for example, a set of related search queries for each product in the catalog based on network page views and customer purchases. While operational systems may be optimized for speed of recording business transactions, data warehouses may be optimized for speed of data analysis.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to managing data dependencies in systems such as, for example, data warehouses. As a non-limiting example, a first set of data may be requested that depends on a second set of data that is obtained from another system. Until the second set of data is loaded and the dependency is satisfied, the first set of data may not be produced. Requesting the first set of data may trigger the loading of the second set of data. Meanwhile, the second set of data may itself have been requested by another process. Periodically polling to determine when a dependency is satisfied can be resource intensive and introduce latency. Rather than periodically polling, various embodiments of the present disclosure track dependencies with two tracking points. The first tracking point occurs when the necessary data is loaded, and the second tracking point occurs when the necessary data is requested. In the following discussion, a general description of the system and its components is provided, followed by a discussion of the operation of the same.

Figure 1:
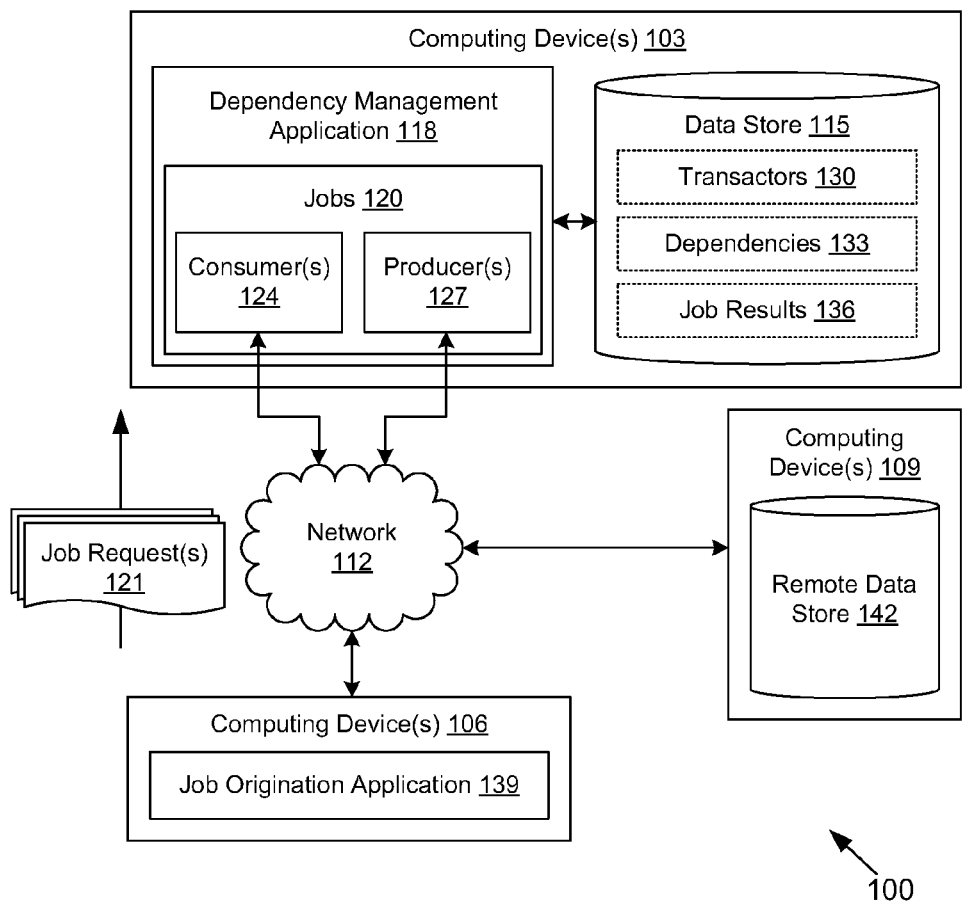
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 106 and one or more computing devices 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. In various embodiments, the data store 115 may comprise a relational database management system employing structured query language (SQL). In various embodiments, the data store 115 may be associated with one or more of the properties of atomicity, consistency, isolation, and/or durability. The data stored in the data store 115, for example, is associated with the operation of the various applications and/or functional entities described below. In one embodiment, the computing device 103 is a data warehouse system.

The components executed on the computing device 103, for example, include a dependency management application 118 and other applications, services, processes, systems, engines, or functionality not discussed in detail herein. The dependency management application 118 is executed to obtain job requests 121 from one or more computing devices 106 and to execute jobs 120 based on the job requests 121. The jobs 120 may correspond, for example, to extract-transform-load (ETL) processes and other processes. The jobs 120 may each be classified as a consumer 124, a producer 127, or both. A consumer 124 has one or more unsatisfied dependencies on data produced by one or more producers 127. A producer 127 satisfies one or more unsatisfied dependencies of one or more consumers 124 by producing data. As non-limiting examples, a producer 127 may correspond to an extract process, and a consumer 124 may correspond to a load process.

The data stored in the data store 115 includes, for example, transactors 130, dependencies 133, job results 136, and potentially other data. The transactors 130 may comprise a sequential number generator or any facility provided by the data store 115 to ensure that operations regarding dependencies 133 and job results 136 are performed in a sequential order. The dependencies 133 comprise identifications of consumers 124 which are depending on data produced by producers 127. In one embodiment, the dependencies 133 may be marked as satisfied or unsatisfied. The job results 136 correspond to data or identifications of data produced by producers 127. In one embodiment, dependencies 133 and job results 136 are implemented as separate tables within the data store 115.

The computing device 106 may comprise, for example, a server computer, a client computer, or any other system providing computing capability. Alternatively, a plurality of computing devices 106 may be employed that are arranged, for example, in one or more server banks or computer banks or other arrangements. For example, a plurality of computing devices 106 together may comprise, for example, a cloud computing resource, a grid computing resource, and/or any other distributed computing arrangement. Such computing devices 106 may be located in a single installation or may be dispersed among many different geographical locations. In one embodiment, the computing device 106 represents a virtualized computer system executing on one or more physical computing systems.

Where the computing device 106 comprises a client computer, the computing device 106 may be embodied in the form of a desktop computer, a laptop computer, a personal digital assistant, a cellular telephone, set-top box, music players, web pads, tablet computer systems, or other devices with like capability. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. The components executed on the computing device 106, for example, include a job origination application 139 and other applications, services, processes, systems, engines, or functionality not discussed in detail herein. The job origination application 139 is executed to generate and submit job requests 121 to the dependency management application 118. Such job requests 121 may be originated, for example, to obtain data for use in creating reports or analyses for an organization.

The computing device 109 may comprise, for example, a server computer or any other system providing computing capability. Alternatively, a plurality of computing devices 109 may be employed that are arranged, for example, in one or more server banks or computer banks or other arrangements. For example, a plurality of computing devices 109 together may comprise, for example, a cloud computing resource, a grid computing resource, and/or any other distributed computing arrangement. Such computing devices 109 may be located in a single installation or may be dispersed among many different geographical locations. In one embodiment, the computing device 109 represents a virtualized computer system executing on one or more physical computing systems. For purposes of convenience, the computing device 109 is referred to herein in the singular. Even though the computing device 109 is referred to in the singular, it is understood that a plurality of computing devices 109 may be employed in the various arrangements as described above.

Various applications and/or other functionality may be executed in the computing device 109 according to various embodiments. Also, various data is stored in a remote data store 142 that is accessible to the computing device 109. The remote data store 142 may be representative of a plurality of remote data stores 142 as can be appreciated. In one embodiment, the remote data store 142 and the computing device 109 are operational systems used in performing business transactions for an organization. The data stored in the remote data store 142 may include data necessary for the performance of at least one job 120. Specifically, a producer 127 may be configured to obtain data from the remote data store 142 over the network 112.

Next, a general description of the operation of the various components of the networked environment 100 is provided. To begin, a job request 121 is generated by the job origination application 139 and submitted over the network 112 to the dependency management application 118 executed on the computing device 103. The job request 121 may be for some data that is maintained in disparate remote data stores 142. As a non-limiting example, where the organization operating the networked environment 100 is an online retailer, the job request 121 may, for example, relate to determining a set of related search queries for each product in a catalog of products from search queries and product selections. The data necessary to process the job request 121 may be stored, for example, in two remote data stores 142. As non-limiting examples, search query data may be stored in a first remote data store 142 and product selection data may be stored in a second remote data store 142.

The dependency management application 118 may then launch a job 120 to perform the job request 121. The job 120 may comprise, for example, a separate process or a separate thread and may be launched on a same computing device 103 as other jobs 120 or on a different computing device 103. In one embodiment, the job 120 executes concurrently with other jobs 120 managed by the dependency management application 118.

The dependency management application 118 may determine that the job 120 depends on data produced by another job 120. In other words, the dependency management application 118 identifies a dependency 133. In such a case, the first job 120 may be considered to be a consumer 124 of the data, while the second job 120 may be considered to be the producer 127 of the data. The producer 127 may already be executing in response to some other job request 121, or the producer 127 may be launched in response to the dependency 133 of the consumer 124. It is noted that a single job 120 may correspond to both a consumer 124 and a producer 127. In other words, a producer 127 that produces a set of data may also depend on another producer 127 for at least a portion of the set of data. The references herein to the consumer 124 and the producer 127 therefore refer to a current relation of one job 120 to another job 120.

It is also noted that a job 120 may have a plurality of dependencies 133. The job 120 may depend, for example, on multiple data items produced by another job 120. Also, the job 120 may depend, for example, on data items produced by multiple other jobs 120. Similarly, multiple jobs 120 may depend on a single data item produced by a job 120, and different jobs 120 may depend on different data items produced by the job 120.

When a dependency 133 is identified for a consumer 124, the dependency 133 may be recorded in the data store 115 by the consumer 124. The dependency 133 may be initially marked as unsatisfied. In another embodiment, the dependency 133 may be unmarked or marked with a null or empty value. The dependency 133 may identify the data required by the consumer 124 and/or a producer 127 that is configured to produce the data.

Next, the consumer 124 may determine whether the data has been produced and whether the dependency 133 has been satisfied. For example, the consumer 124 may refer to the job results 136 in the data store 115 to determine whether the desired data has been produced. In one embodiment, the consumer 124 may execute an SQL select statement upon a table corresponding to the job results 136. If the dependency 133 has been satisfied, the consumer 124 may update the dependency 133 as being satisfied and then continue execution using the valid data.

If, instead, the dependency 133 has not been satisfied, the consumer 124 may enter a waiting or sleeping mode until notification that the dependency 133 has been satisfied. In other words, the execution of the consumer 124 may be suspended when the consumer 124 or another thread determines that the dependency 133 is unsatisfied.

Meanwhile, the producer 127 may perform a load operation or some other operation in order to produce data. The data may be obtained, for example, from the data store 115, the remote data store 142, or some other location. In various embodiments, the data may correspond to a file, a file identifier, a pointer, a buffer, or other form of data. The producer 127 may then indicate that the data is valid and available by recording an indication in the job results 136. In one embodiment, the producer 127 may record the data within the job results 136. In another embodiment, the producer 127 may merely record an identifier of the data in the job results 136. Such an identifier may include the output of a hashing algorithm, a file name, a uniform resource identifier (URI), or other identifier. Other metadata regarding the data may also be stored in the job results 136. Such metadata may comprise, for example, timestamps, data validity conditions, and other metadata.

The producer 127 may then determine any unsatisfied dependencies 133 in the data store 115 that depend on the data that has been produced. To this end, the dependencies 133 may describe consumers 124 that are waiting on the data that has been produced. In one embodiment, the data may be described using the same identifier recorded by the producer 127 in the job results 136. In one embodiment, the producer 127 may execute an SQL select statement upon a table corresponding to the dependencies 133. Consequently, the producer 127 may then update all of the corresponding unsatisfied dependencies 133 to be satisfied. When the dependencies 133 are marked as satisfied, the consumers 124 waiting on the data may resume execution. To this end, the producer 127 may notify or otherwise awaken the consumers 124 that are waiting for the data. Thus, the consumers 124 may resume execution synchronously with the satisfaction of the dependencies 133. In other embodiments, the resumption of execution of the consumers 124 may be asynchronous, for example, upon the expiration of a predefined time period or some other condition.

It can be seen that the communication described above between the producers 127 and consumers 124 using the data store 115 may render polling unnecessary, thereby freeing up system resources that would otherwise be used. Although the embodiments described above use a data store 115, as an alternative, a message bus may be used to facilitate communication and coordination. Although the data store 115 may comprise a relational database management system employing SQL, it is understood that other types of data stores 115 may instead be used. For example, a data store 115 providing a key-value-pair storage service may be used in conjunction with a number generator that provides transactors 130.

In some embodiments, restrictions may be necessary to ensure the proper operation of the dependency management application 118. As a non-limiting example, it may be necessary to provide a restriction that a dependency 133 that has been satisfied cannot be updated to be unsatisfied. If the data indicated by the dependency 133 becomes invalid for some reason, it may be necessary for the dependency management application 118 to create a new dependency 133 that is unsatisfied. As another non-limiting example, it may be necessary that each operation regarding a dependency 133 be repeated when an error preventing completion of the operation occurs. As yet another non-limiting example, operations regarding dependencies 133 may need to be ordered and committed to storage in the data store 115 to ensure consistency.

Figure 2:
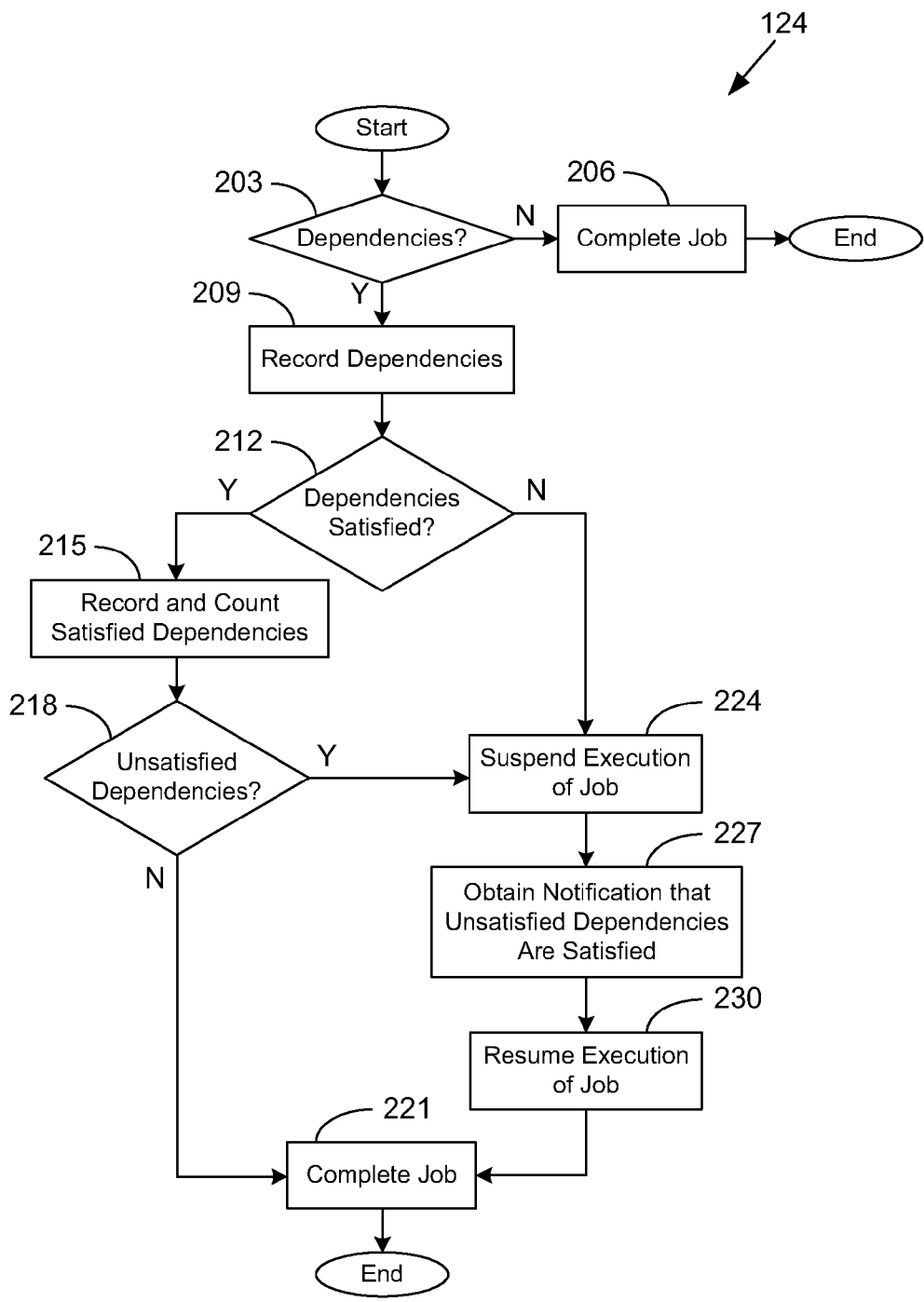
FIGS. 2 and 3 are flowcharts illustrating examples of functionality implemented as portions of a dependency management application executed in a computing device in the networked environment of FIG. 1 according to various embodiments of the present disclosure.

Referring next to FIG. 2, shown is a flowchart that provides one example of the operation of a portion of the dependency management application 118 (FIG. 1) according to various embodiments. Specifically, FIG. 2 illustrates an example of the operation of a job 120 (FIG. 1) operating as a consumer 124. It is understood that the flowchart of FIG. 2 provides merely an example of the many different types of functional arrangements that may be employed to implement the operation of the portion of the dependency management application 118 as described herein. As an alternative, the flowchart of FIG. 2 may be viewed as depicting an example method implemented in the computing device 103 (FIG. 1) according to one or more embodiments.

Beginning with box 203, the consumer 124 determines whether the consumer 124 consumes data produced by one or more producers 127. In other words, the consumer 124 determines whether the consumer 124 has one or more dependencies 133 (FIG. 1). If the consumer 124 determines that there are no dependencies 133, the consumer 124 proceeds to box 206 and completes the job 120. Thereafter, the consumer 124 ends.

If the consumer 124 instead determines that there are one or more dependencies 133, then the consumer 124 moves to box 209 and records the dependencies 133 in the data store 115 (FIG. 1). In one embodiment, the consumer 124 may instead pass a message indicating a dependency 133 by way of a message bus. A transaction may be initiated using a transactor 130 (FIG. 1) to maintain proper sequencing of the operation.

Next, in box 212, the consumer 124 determines whether any of the dependencies 133 are satisfied. To this end, the consumer 124 may consult the job results 136 (FIG. 1) to determine whether the necessary data is available. If the consumer 124 determines that one or more of the dependencies 133 have been satisfied, the consumer 124 moves to box 215 and records the dependencies 133 as being satisfied in the data store 115 and counts the satisfied dependencies 133. In one embodiment, the consumer 124 may instead pass a message indicating satisfaction of the dependencies 133 by way of a message bus.

In box 218, the consumer 124 determines whether any of the dependencies 133 remain unsatisfied according to the count of satisfied dependencies 133. If none of the dependencies 133 remain unsatisfied, the consumer 124 moves to box 221 and completes the job 120. Thereafter, the consumer 124 ends. If the consumer 124 determines that none of the dependencies 133 are satisfied in box 212, or if the consumer 124 determines that unsatisfied dependencies 133 remain in box 218, the consumer 124 proceeds to box 224.

In box 224, the consumer 124 suspends execution of the job 120. Meanwhile, one or more producers 127 (FIG. 1), which may be newly launched by the dependency management application 118 in response to the dependencies 133 or may be otherwise executing concurrently, extract, transform, and/or load data. The producers 127 record identifications of the loaded data in the job results 136 (FIG. 1). In box 227, the consumer 124 obtains a notification that the unsatisfied dependencies 133 are now satisfied. In one embodiment, the notification is performed by the producer 127. In another embodiment, the notification is performed by a thread that repeatedly polls the dependencies 133 to determine when they are satisfied. Alternatively, the consumer 124 may repeatedly poll the dependencies 133 to determine when they are satisfied. In box 230, the consumer 124 resumes execution of the job 120, and the job 120 is completed in box 221. Thereafter, the consumer 124 ends.

Figure 3:
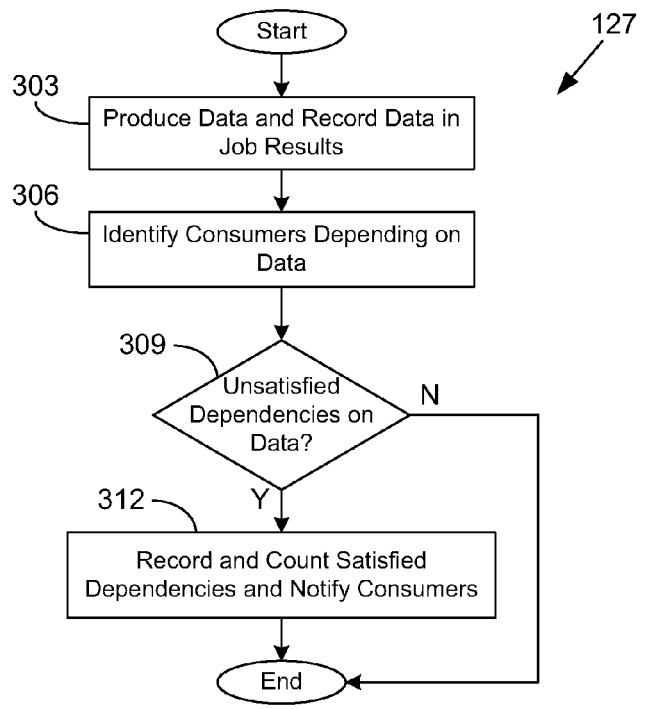

Turning now to FIG. 3, shown is a flowchart that provides one example of the operation of a portion of the dependency management application 118 (FIG. 1) according to various embodiments. Specifically, FIG. 3 illustrates an example of the operation of a job 120 (FIG. 1) operating as a producer 127. It is understood that the flowchart of FIG. 3 provides merely an example of the many different types of functional arrangements that may be employed to implement the operation of the portion of the dependency management application 118 as described herein. As an alternative, the flowchart of FIG. 3 may be viewed as depicting an example method implemented in the computing device 103 (FIG. 1) according to one or more embodiments.

Beginning with box 303, the producer 127 produces data and records the data or at least an identification of the data in the job results 136 (FIG. 1). The data may be extracted, for example, from a remote data store 142 (FIG. 1) or other location, and may be processed and loaded for use by other jobs 120. The producer 127 may have been launched in response to a job request 121 (FIG. 1) from a job origination application 139 (FIG. 1) or may have been launched in response to the determination of a dependency 133 (FIG. 1).

Next, in box 306, the producer 127 identifies one or more consumers 124 (FIG. 1) from that depend on the produced data. In box 309, the producer 127 determines whether there are any unsatisfied dependencies 133 on the produced data. The dependencies 133 may, for example, indicate a relationship between an identification of the data and an identification of one or more consumers 124. If there are no unsatisfied dependencies 133 on the produced data, the producer 127 ends. Otherwise, the producer 127 moves to box 312. In box 312, the producer 127 records the dependencies 133 as being satisfied, counts the satisfied dependencies 133, and notifies the consumers 124 identified with the dependencies 133. In other embodiments, another thread or process may notify the consumers 124. The notification may be performed synchronously or asynchronously. Thereafter, the producer 127 ends.

Figure 4:
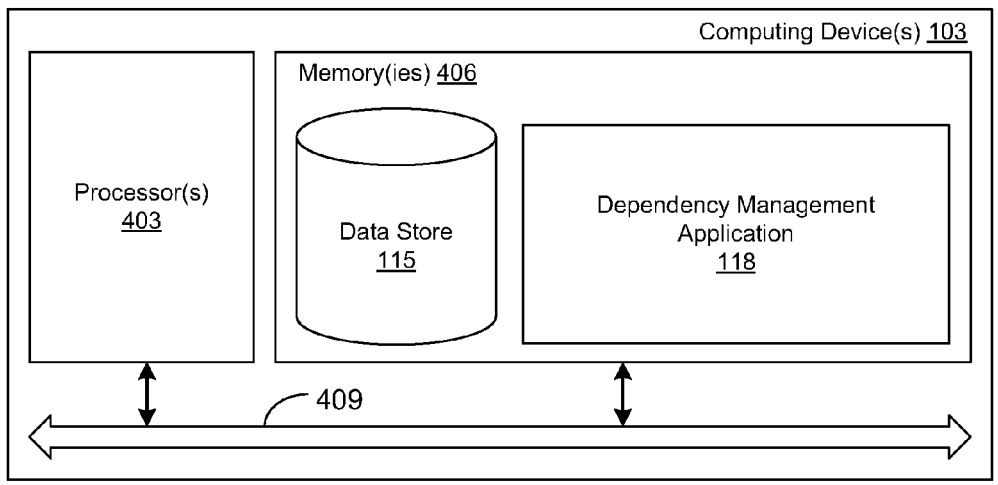
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the dependency management application 118 and potentially other applications. Also stored in the memory 406 may be a data store 115 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, SQL, Procedural Language/SQL (PL/SQL), or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 112 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the dependency management application 118 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the dependency management application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, various blocks shown in FIGS. 2 and 3 may be omitted in other embodiments. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the dependency management application 118, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one physical computing device; and
   a dependency management application executable in the at least one physical computing device, the dependency management application comprising:
   logic that executes a plurality of jobs;
   logic that determines that a first one of the plurality of jobs depends on a completion of at least another one of the plurality of jobs and records at least one corresponding dependency as being unsatisfied, the at least one corresponding dependency indicating dependence of the first one of the plurality of jobs on the completion of the at least another one of the plurality of jobs;
   logic that suspends execution of the first one of the plurality of jobs when at least one of the at least one corresponding dependency is determined to be unsatisfied, the at least one of the at least one corresponding dependency remaining unsatisfied until being updated as being satisfied;
   logic that updates the at least one corresponding dependency as being satisfied when the at least another one of the plurality of jobs completes execution, the logic that updates further comprising:
   logic that records a corresponding job result in a data store when the at least another one of the plurality of jobs completes execution, wherein the corresponding job result is recorded in a first table and the dependencies are recorded in a second table;
   logic that determines a plurality of unsatisfied dependencies that depend on the corresponding job result; and
   logic that updates each one of the unsatisfied dependencies as being satisfied; and
   logic that resumes execution of the first one of the plurality of jobs when every one of the at least one corresponding dependency is satisfied.

2. The system of claim 1, wherein the logic that resumes is executed synchronously in response to the logic that updates.

3. The system of claim 1, wherein the plurality of jobs are executed as separate threads.

4. The system of claim 1, wherein the dependency management application further comprises:
   logic that obtains a job request from another computing device; and
   logic that launches execution of one of the plurality of jobs in response to the job request.

5. The system of claim 4, wherein the dependency management application further comprises logic that launches execution of another job in response to a dependency of the one of the plurality of jobs on the another job.

6. The system of claim 1, wherein at least a portion of at least one of the plurality of jobs is executed on another physical computing device.

7. The system of claim 1, wherein the at least one corresponding dependency is recorded in a data store providing atomicity and isolation.

8. The system of claim 1, wherein a dependency that is satisfied cannot be updated as being unsatisfied.

9. The system of claim 1, wherein the dependency management application is a component of a data warehouse system.

10. A method, comprising:
executing, in a physical computing device, a plurality of jobs;
determining, in the physical computing device, that a first one of the plurality of jobs depends on a completion of at least another one of the plurality of jobs and recording at least one corresponding dependency as being unsatisfied, the at least one corresponding dependency indicating dependence of the first one of the plurality of jobs on the completion of the at least another one of the plurality of jobs;
suspending, in the physical computing device, execution of the first one of the plurality of jobs when at least one of the at least one corresponding dependency is determined to be unsatisfied, the at least one of the at least one corresponding dependency remaining unsatisfied until being updated as being satisfied;
updating, in the physical computing device, the at least one corresponding dependency as being satisfied when the at least another one of the plurality of jobs completes execution, the updating further comprising:
recording a corresponding job result in a data store when the at least another one of the plurality of jobs completes execution, wherein the corresponding job result is recorded in a first table and the dependencies are recorded in a second table;
determining a plurality of unsatisfied dependencies that depend on the corresponding job result; and
updating each one of the unsatisfied dependencies as being satisfied; and
resuming, in the physical computing device, execution of the first one of the plurality of jobs when every one of the at least one corresponding dependency is satisfied.

11. The method of claim 10, wherein the resuming is performed synchronously in response to the updating of the at least one corresponding dependency as being satisfied.

12. The method of claim 10, wherein the plurality of jobs are executed as separate threads.

13. The method of claim 10, wherein the at least one corresponding dependency is recorded in a data store providing atomicity and isolation.

14. The method of claim 10, wherein a dependency that is satisfied cannot be updated as being unsatisfied.

15. The method of claim 10, wherein each operation regarding a dependency is ordered.

16. The method of claim 10, wherein each operation regarding a dependency is configured to be repeated when an error preventing completion of the operation occurs.

17. A system, comprising:
at least one physical computing device configured to at least:
execute a plurality of jobs;
determine that a first one of the plurality of jobs depends on a completion of at least another one of the plurality of jobs and records at least one corresponding dependency as being unsatisfied, the at least one corresponding dependency indicating dependence of the first one of the plurality of jobs on the completion of the at least another one of the plurality of jobs;
suspend execution of the first one of the plurality of jobs when at least one of the at least one corresponding dependency is determined to be unsatisfied, the at least one of the at least one corresponding dependency remaining unsatisfied until being updated as being satisfied;
update the at least one corresponding dependency as being satisfied when the at least another one of the plurality of jobs completes execution;
resume execution of the first one of the plurality of jobs when every one of the at least one corresponding dependency is satisfied;
wherein each operation regarding a dependency is ordered;
wherein each operation regarding a dependency is configured to be repeated when an error preventing completion of the operation occurs; and
wherein at least one of the plurality of jobs comprises at least a portion of an extract-transform-load (ETL) process.

18. The system of claim 17, wherein the at least one physical computing device is further configured to at least:
record a corresponding job result in a data store when the at least another one of the plurality of jobs completes execution;
determine a plurality of unsatisfied dependencies that depend on the corresponding job result; and
update each one of the unsatisfied dependencies as being satisfied.

19. The system of claim 17, wherein the plurality of jobs are executed as separate threads.

20. The system of claim 17, wherein a dependency that is satisfied cannot be updated as being unsatisfied.

* * * * *